United States Patent
Bhagwan et al.

(10) Patent No.: US 10,210,231 B2
(45) Date of Patent: *Feb. 19, 2019

(54) OPTIMAL ANALYTIC WORKFLOW

(71) Applicant: International Business Machines Corporation, Armonk, NY (US)

(72) Inventors: Varun Bhagwan, San Jose, CA (US); Clemens Drews, San Jose, CA (US); Daniel F. Gruhl, San Jose, CA (US); Neal R. Lewis, San Jose, CA (US); April L. Webster, Mountain View, CA (US); Steven R. Welch, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 489 days.

This patent is subject to a terminal disclaimer.

(21) Appl. No.: 14/819,544

(22) Filed: Aug. 6, 2015

(65) Prior Publication Data

US 2017/0039249 A1 Feb. 9, 2017

(51) Int. Cl.
*G06F 7/02* (2006.01)
*G06F 17/30* (2006.01)
(Continued)

(52) U.S. Cl.
CPC .... *G06F 17/30572* (2013.01); *G06F 11/3409* (2013.01); *G06F 17/30463* (2013.01);
(Continued)

(58) Field of Classification Search
CPC ............... G06Q 10/06; G06F 11/3409; G06F 17/30463; G06F 17/30539; G06F 17/30572
See application file for complete search history.

(56) References Cited

U.S. PATENT DOCUMENTS

| | | | |
|---|---|---|---|
| 6,970,805 B1 * | 11/2005 | Bierma | G06F 11/3433 702/182 |
| 8,966,569 B2 | 2/2015 | Schwartz et al. | |

(Continued)

FOREIGN PATENT DOCUMENTS

| WO | 2012015988 A1 | 2/2012 |
|---|---|---|
| WO | 2016182483 A1 | 11/2016 |

OTHER PUBLICATIONS

IBM, "Deriving SLA for Composite Web Services with Multiple Implementation Options", IP.com No. IPCOM000175762D, Publication Date: Oct. 23, 2008, pp. 1-12.
(Continued)

*Primary Examiner* — Bruce M Moser
(74) *Attorney, Agent, or Firm* — Reza Sarbakhsh

(57) ABSTRACT

Embodiments of the present invention disclose a method, computer program product, and system for optimizing data analysis. A set of analytics are received and a plurality of subsets of the set of analytics is generated. An optimization goal(s) is defined. The plurality of subsets of analytics are applied to a set of data. The output of applied analytics are recorded on a data storage device by the computer. Performance values of the computer applying the plurality of subsets of analytics are recorded and displayed. An optimal subset of the plurality of subsets of analytics is calculated, using recorded performance values and outputs of the applied plurality of subsets of analytics, being based on the optimization goal. A set of applied analytics are displayed, where the set of applied analytics includes a number of subsets of analytics of the plurality of analytics that meet the criteria of the optimal subset.

18 Claims, 4 Drawing Sheets

(51) Int. Cl.
*G06F 11/34* (2006.01)
*G06Q 10/06* (2012.01)

(52) U.S. Cl.
CPC .. *G06F 17/30469* (2013.01); *G06F 17/30477* (2013.01); *G06F 17/30539* (2013.01); *G06F 17/30554* (2013.01); *G06F 17/30569* (2013.01); *G06Q 10/06* (2013.01)

(56) References Cited

U.S. PATENT DOCUMENTS

| | | | |
|---|---|---|---|
| 9,684,866 | B1 | 6/2017 | Todd, Jr. et al. |
| 2009/0319658 | A1 | 12/2009 | Chioiu et al. |
| 2012/0023056 | A1 | 1/2012 | Matignon et al. |
| 2013/0051247 | A1 | 2/2013 | Reese et al. |
| 2014/0337429 | A1* | 11/2014 | Asenjo ................ H04L 65/403 709/204 |
| 2014/0372157 | A1 | 12/2014 | Courtney et al. |
| 2015/0277399 | A1 | 10/2015 | Maturana et al. |
| 2015/0294246 | A1 | 10/2015 | Guven Kaya et al. |
| 2016/0098442 | A1 | 4/2016 | Zhu et al. |

OTHER PUBLICATIONS

Gupta et al., "Automating ITSM Incident Management Process", International Conference on Automonic Computing, 2008 IEEE, pp. 141-150.

Chessell et al., "Smarter Analytics: Taking the Journey to IBM Cognitive Systems", IBM Redbooks, REDP-5043-00, Oct. 1, 2013, pp. 1-22.

Quintero et al., "Workload Optimized Systems Tuning POWER7 for Analytics", IBM Redbooks, SG24-8057-00, Oct. 2012, pp. 1-184.

Herodotou et al., "Starfish: A Self-tuning System for Big Data Analytics", 5th Biennial Conference on Innovative Data Systems Research (CIDR '11), Jan. 9-12, 2011, pp. 261-272.

Herodotou et al., "Profiling, What-if Analysis, and Cost-based Optimization of MapReduce Programs", Proceedings of the VLDB Endowment, vol. 4, No. 11, 2011, pp. 1-12.

Agarwal et al., "Re-optimizing Data-Parallel Computing", Proc. of USENIX NSDI, 2012, pp. 1-14.

IBM: List of IBM Patents or Patent Applications Treated as Related (Appendix P), Nov. 7, 2016, pp. 1-2.

Bhagwan et al., Pending U.S. Appl. No. 15/216,724, filed Jul. 22, 2016, titled "Optimal Analytic Workflow," pp. 1-28.

Bhagwan et al., Pending U.S. Appl. No. 15/341,231, filed Nov. 2, 2016, titled "Optimal Analytic Workflow," pp. 1-28.

Bhagwan et al., Pending U.S. Appl. No. 15/341,241, filed Nov. 2, 2016, titled "Optimal Analytic Workflow," pp. 1-28.

IBM: List of IBM Patents or Patent Applications Treated as Related (Appendix P), Jul. 22, 2016, pp. 1-2.

Bhagwan et al., Pending U.S. Appl. No. 15/216,724, filed Jul. 22, 2016, titled "An Optimal Analytic Workflow," pp. 1-28.

* cited by examiner

OPTIMAL ANALYTIC WORKFLOW

BACKGROUND

The present invention generally relates to data analysis, and more particularly to determining an optimal set of analytics for a given data set.

Data analytics (DA) is the science of examining raw data with the purpose of drawing conclusions about that information. Data analytics is used in many industries to allow companies and organization to make better business decisions and in the sciences to verify or disprove existing models or theories. Data analytics is commonly used to aid in data mining depending on the scope, purpose and focus of the analysis. Data miners sort through huge data sets using sophisticated software to identify undiscovered patterns and establish hidden relationships. The data obtained may originate in an analogue paper system. Utilizing Optical Character Recognition, or OCR, systems can convert different types of documents, such as scanned paper files, into editable and searchable data.

As the data undergoing analysis increases, more resources need to be allocated. A subject matter expert, or SME, may interact directly with an analytics system, possibly through a simplified interface, or may codify domain knowledge for use by knowledge engineers or ontologists. An SME is also involved in validating the system results as desirable or optimal. Typically, an SME may manually apply analytics to a data set and may attempt to determine the efficiency of the analysis, which may be time consuming and cumbersome, leading to inefficiencies and extra cost.

SUMMARY

Embodiments of the present invention disclose a method, computer program product, and system for optimizing data analysis. A set of analytics are received and, in response, a plurality of subsets of the set of analytics is generated using a computer. An optimization goal(s) is defined for applying to the plurality of subsets of analytics. The plurality of subsets of analytics are applied to a set of data. The set of data includes a plurality of electronic records. In response to applying the plurality of subsets of analytics to the set of data, an output is recorded on a data storage device by the computer. Performance values, of the computer applying the plurality of subsets of analytics to the set of data, are recorded and displayed. An optimal subset of the plurality of subsets of analytics is calculated, based on the recorded performance values and the recorded output of the applied plurality of subsets of analytics, being based on the optimization goal. A set of applied analytics are communicated to a user, where the set of applied analytics includes a number of subsets of analytics of the plurality of analytics that meet the criteria of the optimal subset.

DETAILED DESCRIPTION

Figure 1:
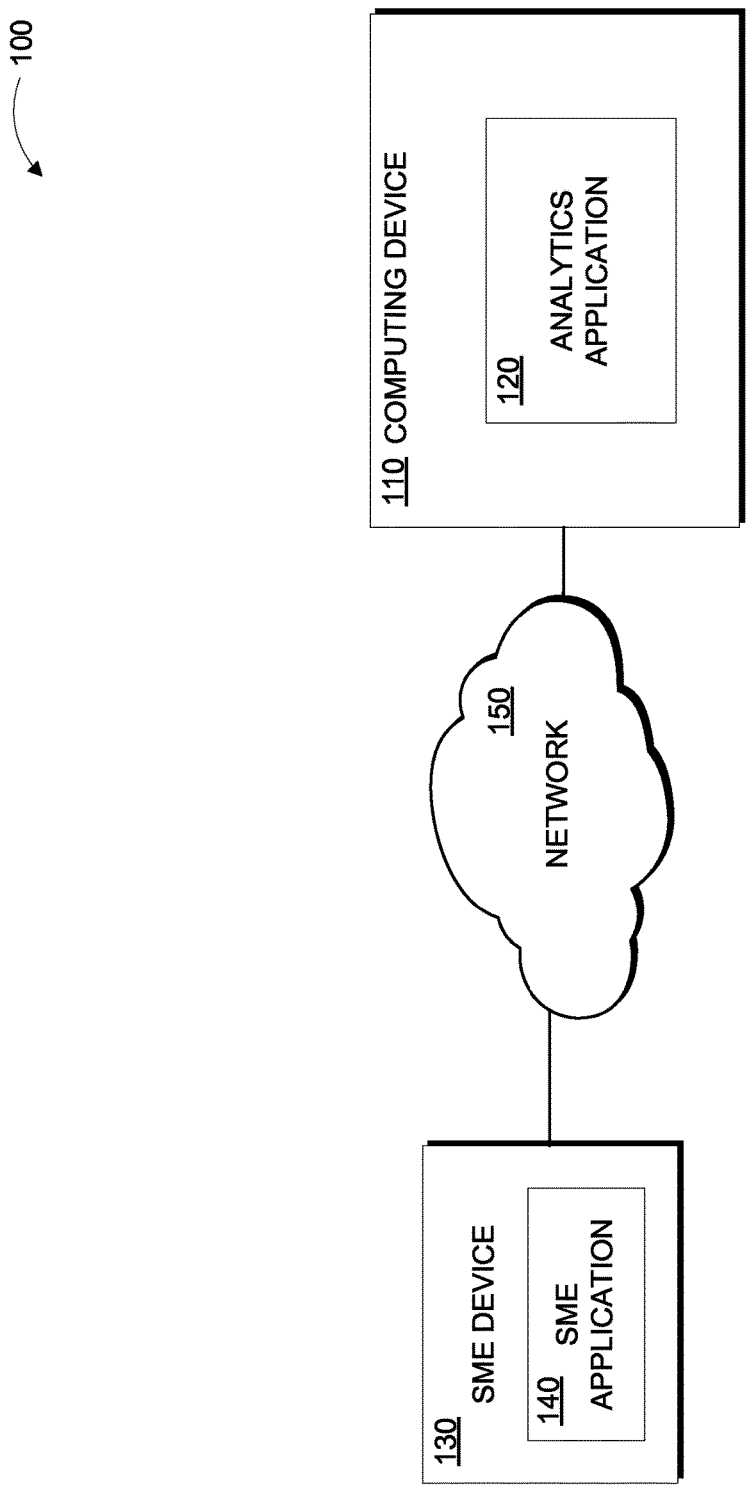
FIG. 1 is a functional block diagram illustrating a distributed data processing environment, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Considering the vast amounts of unstructured and semi-structured data available for analytic systems, as well as the promulgation and diversity of analytics that run on such systems, it is important to provide a means for a user or subject-matter expert ("SME") to provide expectations about how a such a system may perform and what resources may be used in implementing analytics. Providing such performance and resource use data to an SME may reduce workflow development and runtimes in large analytic systems.

For example, a health insurance company may receive 1,000 claims by fax from various hospitals with which it has agreements. The health insurance company may have three machines capable of Optical Character Recognition, or OCR. The three OCR engines may convert the faxes into structured XML data, and a final computer program that takes the three OCR outputs as input to provide a best estimate of XML representation. The insurance company has two different use cases for when they need to run the OCR engines: (1) Once daily it needs a rough estimate of the claimed cost, and (2) once bi-weekly, it needs to perform a more thorough analysis. The two use cases contain differing requirements for the outputs of the system: (1) requires fast execution time with a lower importance given to precision, and (2) requires high precision regardless of execution time.

The quality of their received faxes may vary, as well as the number of faxes and the required data during each extraction. Coupled with differing requirements for desired outputs resource cost and quality, manually reconfiguration the workflow to achieve desired performance would be costly and time consuming. Various embodiments of the present invention may determine the optimal analytic workflow configuration with respect to a desired precision, recall, and/or total cost of resources. Given guidelines, or goals, and functional/non-functional input parameters, or sets of analytics, such as system may significantly reduce time required to reach the desired workflow configuration.

Embodiments of the present invention will be described with reference to the Figures. Referring to FIG. 1, a general distributed data processing environment 100 in accordance with one embodiment of the present invention is shown. Distributed data processing environment 100 includes computing device 110 and SME device 130, interconnected over network 150.

Network 150 may include permanent connections, such as wire or fiber optic cables, or temporary connections made through telephone or wireless communications. Network 150 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Network 150 may also include a number of different types of networks, such as, for example, an intranet, a local area network (LAN), or a wide area network (WAN).

Each of computing device 110 and SME device 130 may be a laptop computer, tablet computer, netbook computer, personal computer (PC), desktop computer, smart phone, or any programmable electronic device capable of an exchange of data packets with other electronic devices, for example, through a network adapter, in accordance with an embodiment of the invention, and which may be described generally with respect to FIG. 4 below. In various embodiments, computing device 110 may be a separate server or series of servers, a database, or other data storage, internal or external to SME device 130.

SME device 130 may act generally to host an application, for example SME application 140. In various embodiments of the invention, SME device 130 may act generally to receive input from a user, communicate user input to SME application 140 for further processing, and communicate with computing device 110 over a network, for example, network 150.

SME application 140 may act generally to receive input from a user, display data in a graphical user interface, or GUI, or communicate over a network, for example network 150, via a web browser. SME application 140 may be able to communicate with computing device 110 over network 150. SME application 140 may receive data, performance records, analysis output, or other communications from computing device 110, as described below, in accordance with an embodiment of the present invention. In various embodiments, SME application 140 may display data to a user in a GUI and receive input to annotate one or more parts of the GUI in an interactive manner. For example, an interactive selection tool may be provided to the user, via SME device 130, to allow the user to select one or more graphical representations of analytics, described in more detail below. The user may make a selection through clicking an input device, for example, a mouse, or any appropriate manner of gestures, touches, combined keys, or any other means of interactive input with the SME device 130. SME application 140 may communicate the received input to computing device 110 through network 150, via SME device 130.

Figure 2:
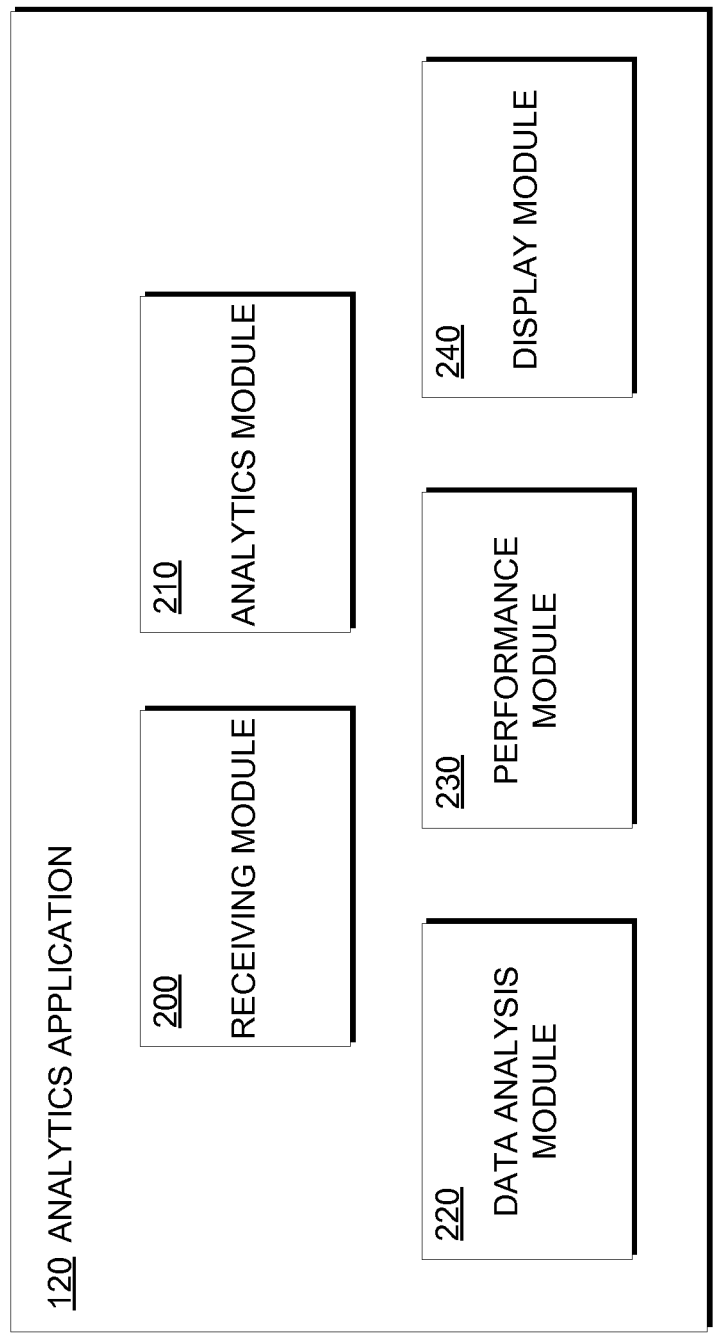
FIG. 2 is a functional block diagram illustrating the components of an application within the distributed data processing environment, in accordance with an embodiment of the present invention.

Computing device 110 includes analytics application 120, as described in more detail in reference to FIG. 2. In various embodiments, computing device 110 operates generally to receive inputs, process a set of data based on the received inputs, record performance data associated with the use of resources within the computing device, for example, computing device 110, communicate results for display to a user device, for example SME device 130, and host applications, for example analytics application 120, which may process and store data.

Analytics application 120 may be, for example, database oriented, computation oriented, or a combination of these. Analytics application 120 may operate generally to receive data from a client device, for example, SME device 130. Received data may include a set of analytics, a set of data, and a set of optimization goals.

Analytics application 120 may receive and store analytics or a set of analytics. An analytic is a program that takes some form of data as input, performs some kind of analysis on it, via various algorithms, and outputs structured information pertaining to the input. For example, in various embodiments of the invention, analytics application 120 may receive a scanned document in Portable Document Format (PDF), perform optical character recognition, or OCR, on the received document, and output an XML representation of the characters and pixel offsets.

In an exemplary embodiment, a set of analytics may be received and an analytic workflow may be generated. An analytics workflow is a collection of disparate analytics represented as a directed graph, such that each analytic is a node in the graph, with dependencies on previous analytics represented as edges. This is merely exemplary and not intended to limit the scope of the present invention in any manner and various representations of a workflow may be implemented.

Analytics application 120 may receive and store a set of data. Data may be any type of electronic document that an OCR may be performed upon. The received data may be the input for the set of received analytics. For example in the healthcare field, health care data consists of patient records collected over varied timeframes in a multitude of formats. Various formats include machine readable, analogue type paper, or hand written. Because of the multitude of formats, systems and ages of data there may not be a single analytic or set of analytics that is able to extract information from all health care records. For example, there might be a dozen different analytics that all purport to extract mentions of drugs from clinical texts. The data input for the application may be a sample corpus of data in order to determine the analytic or set of analytics that is optimal at analyzing the sample corpus. In an embodiment of the invention, optimization goals may be received by analytics application 120 in order to determine the optimal analytic or set of analytics for analyzing data.

In various embodiments an optimization goal or set of optimization goals may be received by analytics application 120 via SME device 130, through network 150. Optimization goals may include, for example, a time limit in which to perform the data analysis, a maximum amount of memory or disc space that can utilized during the analysis, a required precision, or a minimum percentage of recall of the original document. These optimization goals merely examples of various limitations on systems or desires of users and is not intended to limit the scope of the invention.

In an embodiment, analytics application 120 may generate a plurality of subsets of analytics that include all the permutations of the received set of analytics. For example, analytics application 120 may receive a set of three analytics A1, A2, and A3. The set of all permutations of the set of analytics would include subsets: A1; A2; A3; A1A2; A1A3; A2A3; A2A1; A3A1; A3A2; A1A2A3; A1A3A2; A2A1A3; A2A3A1; A3A2A1; and A3A1A2. Analytics application 120 may apply each subset of analytics to the received data and periodically monitor and/or record the computer resources in order to store performance data of the computer system, for example, computing device 110.

Analytics application 120 may monitor and/or record: the amount of time it takes to apply a subset of analytics to the received data; the maximum CPU or RAM usage during the application of a subset of analytics to the received data; the amount of memory used to store data the results of apply a subset of analytics to the received data; or the bandwidth usage of network 150 during communications from analytics application 120. The monitored resources described above are mere exemplary and are not intended to limit the present invention.

Analytics application 120 may communicate results from applying subsets of analytics to the received data for display to SME device 130 through network 150. In various embodiments, analytics application 120 may communicate a predetermined number of subsets of analytics. The subsets of analytics to be displayed may be based on a number of subsets that analyzed the received data, meeting or approaching the optimization goals received by analytics application 120. In various embodiments, analytics application 120 may receiving a user selection of a subset, via SME device 130, from the set of displayed subsets. The user selection may be a subset that performed the data analysis while meeting the optimization goals and, therefore, may be associated with that data set or type of data set. In various embodiments a selected subset may be optimal for a type of data and may be automatically applied to new data sets of the same type. In an embodiment, analytics application 120 may receive additional optimization goals or an addition data set.

Referring to FIG. 2, FIG. 2 a functional block diagram illustrating the components of analytics application 120 within the distributed data processing environment 100 of FIG. 1. Analytics application 120 may operate generally to receive data via computing device 110, process received data, and store or communicate process outputs. Analytics application 120 includes receiving module 200, analytics module 210, data analysis module 220, performance module 230, and display module 240.

In reference to FIGS. 1 and 2, receiving module 200 may act generally to receive sets of data, a set of analytics, a set of optimization goals, and/or input from a user. In an embodiment of the present invention, receiving module 200 may receive a set of data, for example digital PDF scans of documents, a set of analytics, for example, ORC algorithms to extract the textual data from the scanned documents, and a set of optimization goals, for example, a maximum time threshold of 1 hour. Receiving module 200 may communicate the set of analytics to analytics module 210, and set of data to data analysis module 220, and the optimization goals to performance module 230.

Analytics module 210 may act generally to receive a set of analytics from receiving module 200, generate a plurality of subsets of the received set of analytics, communicate the plurality of subsets to data analysis module 220, or store the plurality of subsets of analytics in a data store in memory. Analytics module 210 may generate a plurality of subsets of analytics based on the received set of analytics. A plurality of subsets of analytics may include all the permutations of the received set of analytics. For example, analytics module 210 may receive three analytics A1, A2, and A3. The plurality of subsets of analytics may include: A1; A2; A3; A1A2; A1A3; A2A3; A2A1; A3A1; A3A2; A1A2A3; A1A3A2; A2A1A3; A2A3A1; A3A2A1; and A3A1A2. The set of subsets of analytics can be represented by the equation $S(n) = (nP0 + nP1 + nP2 + \ldots + nPn) - 1$ where S represents a set including all permutations of the set of received analytics, n represents a number of analytics in the set of received analytics, and P represents the permutation function, P being well known in the prior art. Analytics module 210 may communicate the plurality of subsets of analytics to data analysis module 220.

Data analysis module 220 may act generally to apply each subset of analytics, in the plurality of subsets of analysts, to the received set of data and communicate the output to performance module 230. Data analysis module 220 may apply the plurality of subsets of analytics to the set of received data. Data analysis module 220 may apply the plurality of subsets of analytics randomly or in a predetermined order. The output of each of the plurality of subsets of analytics may be stored in a data store in memory or communicated to performance module 230.

Performance module 230 may act generally to periodically query various computer resource monitors, during the application of subsets of analytics to received data, store computer resource data in a data store in memory, and communicate subsets of analytics to be displayed to display module 240. In an embodiment, performance module 230 may query the computer resource monitors of a computing device and record resource statistics, for example, CPU times, RAM use, hard disk space, network bandwidth or throughput, power consumption, etc. In an embodiment, performance module 230 may record computer resources as performance values during the application of the plurality of subsets of analytics to the set of data. For example, analytic subset [A1A2A3] is applied to a set of data and the time it takes for the subset [A1A2A3] to be applied to the data set is recorded. Performance module 230 may compare the recorded performance value with a received optimization goal and performance module 230 may communicate subsets of analytics to display module 240 if they meet the optimization goal. For example, if the optimization goal was a subset of analytics using less than 2 gb of RAM and subset [A2A3] is applied to the set of data and never utilized more than 1 gb of RAM and subset [A1A3] utilized 3.5 gb of RAM, performance module 230 may communicate subset [A2A3] to display module 240 for display.

Display module 240 may act generally to communicate subsets of analytics to be displayed to SME device 130, through network 150, and receive selection input from a user via SME device 130. Display module 240 may receive a plurality of subsets of analytics from performance module 230 that met optimization goals. In various embodiments, the optimal plurality of subsets may be communicated to SME device 130 for display via a GUI on SME application 140. In an embodiment display module 240 may display a GUI including a web-map such that each analytic is a node in the graph, with dependencies on previous analytics represented as edges. This is merely an example and is not intended to be limiting.

In an embodiment, display module 240 may receive a user selection from SME device 130 via a user selection input received by SME application 140. SME application 140 may display in a GUI the optimal plurality of subsets communicated from display module 240. SME application 140 may receive a user input selecting a single subset from the optimal plurality of subsets, or optimal subset, and communicate the optimal subset to display module 240. Display module 240 may store the received optimal subset in a data store in memory or associate the optimal subset with the data set to which the optimal subset was applied. For example, if subset [A2A1] was applied to set of data D, and subset [A2A1] was selected as the optimal subset, display module 240 may associate subset [A2A1] to set of data D and communicate the association to data analysis module 220.

Data analysis module 220 may apply the optimal subset to sets of data similar to set of data D, i.e. subset [A2A1] would be established as the Analytic Workflow for set of data D and data similar to set of data D.

Figure 3:
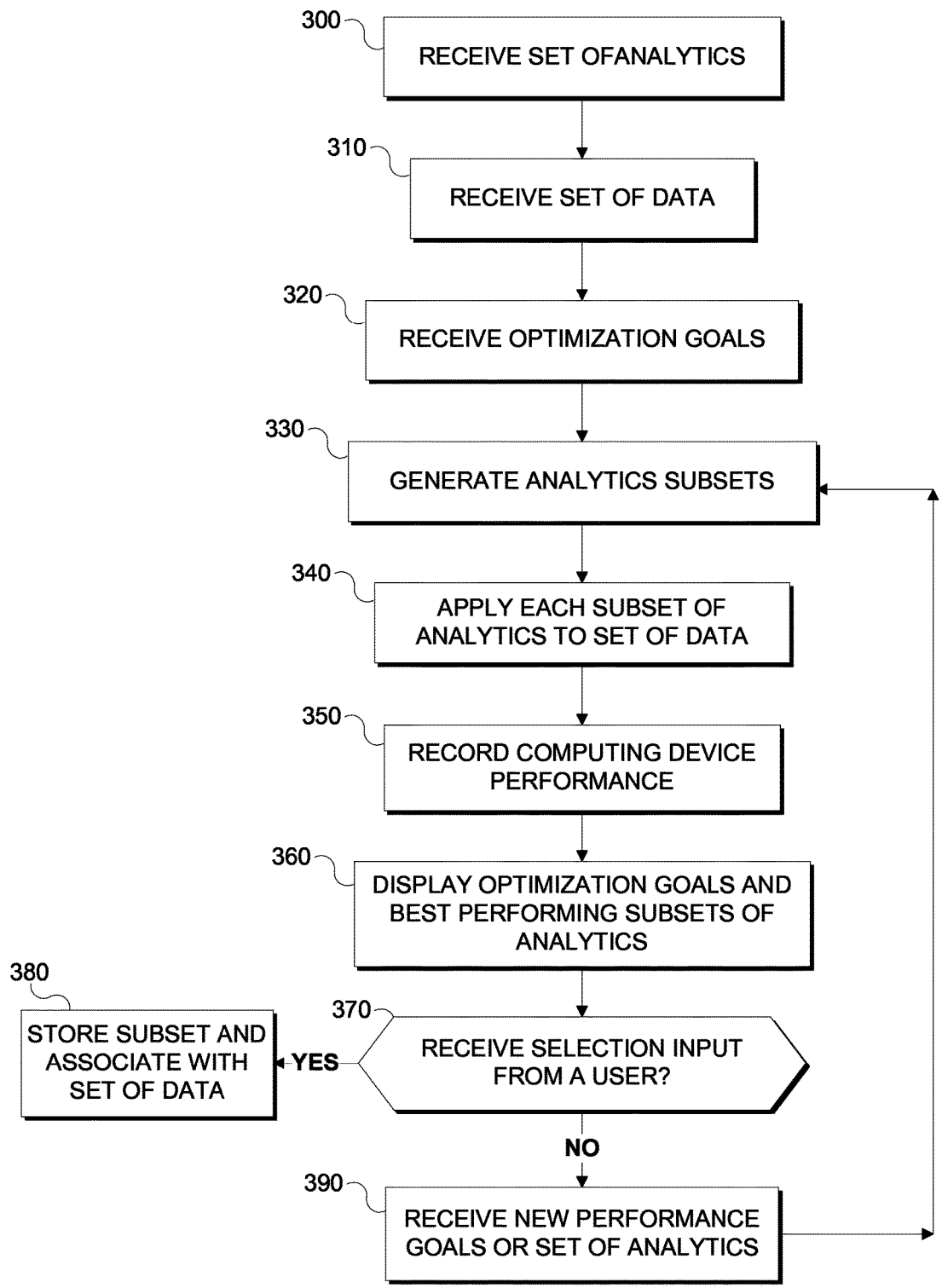
FIG. 3 is a flowchart depicting operational steps of an application on a computing device, within the data processing environment of FIG. 1, for applying sets of analytics to data sets, in accordance with an embodiment of the present invention.

FIG. 3 is a flowchart depicting operational steps of an analytics application 120 running on computing device 110, within the data processing environment of FIG. 1, for applying sets of analytics to data sets, in accordance with an embodiment of the present invention. Referring now to FIGS. 1, 2, and 3, in step 300, receiving module 200 receives a set of analytics from SME device 130 through network 150. The set of analytics may be stored in a data store in memory for later processing. Receiving module 200 receives a set of data in step 310, the set of data may be any textual, numerical, or graphical data to be processed by analytics. In step 320, receiving module 200 receives optimization goals. Optimization goals may be received from a user via SME device 130 and may be based on a maximum allowed time for analytics to be performed, a maximum resource allowed for the analytics to be performed, a minimum amount of data retention, and/or a minimum accuracy that should be achieved. In various embodiments, optimization goals may be received at any time. Receiving module 200 communicates the received set of analytics to analytics module 210, the set of data to data analysis module 220, and the optimization goals to performance module 230.

Analytics module 210 receives a set of analytics communicated from receiving module 200 and generates a plurality of subsets of analytics based on the received set of analytics in step 330. The plurality of subsets of analytics include all the permutations of the received set of analytics as described above. Analytics module 210 may store the plurality of subsets of analytics in a data store in memory or communicate the plurality of subsets of analytics to data analysis module 220.

In step 340 data analysis module 220 receives a plurality of subsets of analytics and applies each subset of analytics within the plurality of subsets to the set of data received from receiving module 200. Data analysis module 220 applied each subset of analytics to the data set by performing each analytic in the subset of analytics in the order of that permutation. For example, if the subset [A1A2A3] will be applied to the set of data, analytic A1 will be applied, then A2, followed by A3 in the order of the permutation of the subset. The output of the application of the subsets of analytics may be stored in memory of communicated to performance module 230.

Performance module 230 receives analytics output, based on the application of the plurality of subsets of analytics on the set of data, and optimization goals communicated from receiving module 200. In step 350 performance module 230 periodically queries performance monitors of computing device 110 and records resource use and performance values of computing device 110 in parallel to data analysis module 220 applying the plurality of subsets of analytics to the set of data. Performance module 230 may compare the recorded performance values may and received optimization goals and determine if any of the subsets of analytics in the plurality of subsets performed within the optimization goals, generating a group of subsets of analytics that meet the optimization goals, or optimal subset. In various embodiments the optimal subset may include subsets of analytics that do not meet the optimization goal but perform within a threshold value, which may be predetermined.

Performance module 230 communicates optimization goals, recorded performance values, and the optimal subset to display module 240. In step 360, display module 240 displays the optimal subset and associated recorded performance values to a user via SME application 140 running on SME device 130. In response to receiving a user input selecting a subset of analytics from the optimal set, in decision step 370 "YES" branch, display module 240 stores the selected subset of analytics and associates that subset of analytics with the set of data or data type, in step 380, as described above. In response to receiving additional optimization goals or set of analytics, in step 390, display module 240 communicates the additional optimization goals or set of analytics to data analysis module 220 or analytics module 210 respectively, in decision step 370 "NO" branch.

Figure 4:
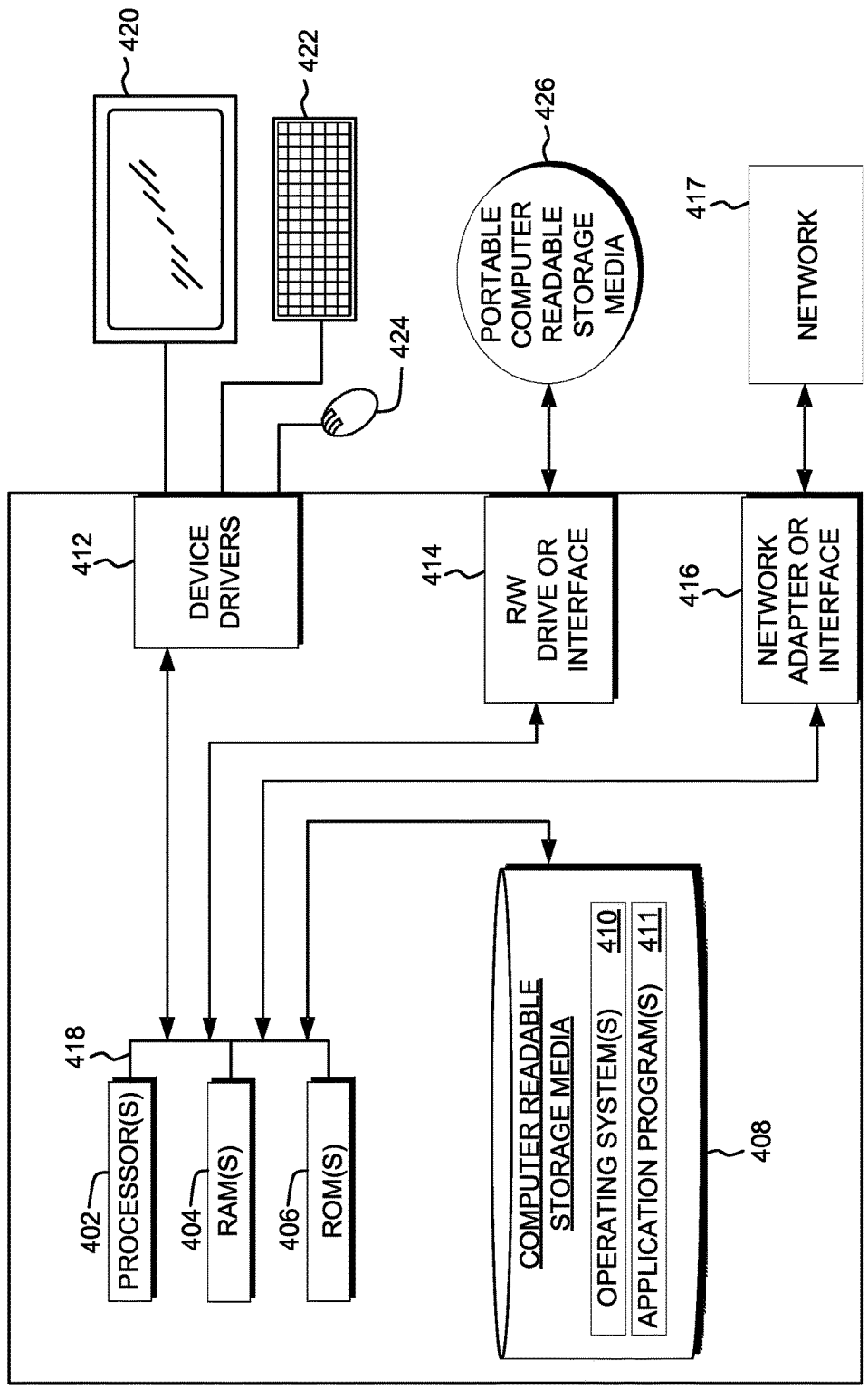
FIG. 4 depicts a block diagram of components of the computing device, in accordance with an embodiment of the present invention.

Referring to FIG. 4, components of computing device 110 and SME device 130 of distributed data processing environment 100, of FIG. 1, are shown and in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 and SME device 130 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, analytics application 120, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 and SME device 130 may also include a R/W drive or interface 414 to read from and write to one or more portable computer readable storage media 426. Application programs 411 on computing device 110 and SME device 130 may be stored on one or more of the portable computer readable storage media 426, read via the respective R/W drive or interface 414 and loaded into the respective computer readable storage media 408.

Computing device 110 and SME device 130 may also include a network adapter or interface 416, such as a TCP/IP adapter card or wireless communication adapter (such as a 4G wireless communication adapter using OFDMA technology) for connection to a network 417. Application programs 411 on computing device 110 and SME device 130 may be downloaded to a computing device, for example, computing device 110, from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Computing device 110 and SME device 130 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer implemented method for optimizing data analysis, the method comprising:
   generating a plurality of subsets of analytics of a set of analytics using a computer, in response to receiving the set of analytics;
   defining an optimization goal for applying the plurality of subsets of analytics;
   applying the plurality of subsets of analytics to a set of data which includes a plurality of electronic records;
   generating an output in response to the applying the plurality of subsets of analytics, the output being recorded on a data storage device accessible by the computer;
   recording a set of performance values of the computer system in response to applying the plurality of subsets of analytics to the set of data;
   comparing the recorded set of performance values with the defined optimization goal;
   determining one or more subsets of analytics of the plurality of subsets of analytics, wherein the recorded set of performance values associated with the one or more subsets of analytics are within a threshold difference value of the defined optimization goal;
   identifying an optimal subset of analytics of the one or more subsets of analytics, wherein the performance value of the optimal subset has the smallest deviation from the defined optimization goal when compared to the deviation from the optimization goal of all the performance values of all the one or more subsets of analytics; and
   generating a set of applied analytics, the set of applied analytics includes the optimal subset of analytics of the one or more subsets of analytics.

2. The method of claim 1 further comprising:
   receiving the set of data from a user, through a computer network, the set of data includes a plurality of electronic records;
   storing the set of data on a data storage device;
   applying the plurality of subsets of analytics to the set of data, the set of data being an input to each of the subsets of analytics in the plurality of subset of analytics;
   communicating the set of applied analytics to a user, for display; and
   receiving a user selection input.

3. The method of claim 2, wherein the plurality of electronic records further includes one or more of: a set of textual data; a set of numerical data; and a set of graphical data.

4. The method of claim 1, wherein the optimization goal is defined in response to receiving a user input of a goal criteria, the goal criteria includes one or more of: a maximum time value; a maximum resource value; a minimum data retention value; and a minimum accuracy value.

5. The method of claim 1, wherein the plurality of subsets of analytics include all permutations of the set of analytics.

6. The method of claim 1, further comprising:
   in response to receiving, by the computer system, additional goal criteria from the user, applying the plurality of subsets of analytics to the set of data.

7. A computer program product for optimizing data analysis, the computer program product comprising:
   a computer-readable storage media and program instructions stored on the computer-readable storage media, the program instructions, executable by a device, comprising:
   instructions to generate a plurality of subsets of analytics of a set of analytics, using a computer, in response to receiving the set of analytics;
   instructions to define an optimization goal for applying the plurality of subsets of analytics;
   instructions to apply the plurality of subsets of analytics to a set of data which includes a plurality of electronic records;
   instructions to generate an output in response to the applying the plurality of subsets of analytics, being recorded on a data storage device accessible by the computer;
   instructions to record a set of performance values of the computer system in response to applying the plurality of subsets of analytics to the set of data;
   instructions to compare the recorded set of performance values with the defined optimization goal;
   instructions to determine one or more subsets of analytics of the plurality of subsets of analytics wherein the recorded set of performance values associated with the one or more subsets of analytics are within a threshold difference value of the defined optimization goal;
   instructions to identify an optimal subset of analytics of the one or more subsets of analytics, wherein the performance value of the optimal subset has the smallest deviation from the defined optimization goal when compared to the deviation from the optimization goal of all the performance values of all the one or more subsets of analytics; and
   instructions to generate a set of applied analytics, the set of applied analytics includes the optimal subset of analytics of the one or more subsets of analytics.

8. The computer program product of claim 7 further comprising:
instructions to receive the set of data from the user, through a computer network, the set of data includes a plurality of electronic records;
instructions to store the set of data on a data storage device;
instructions to apply the plurality of subsets of analytics to the set of data, the set of data being an input to each of the subsets of analytics in the plurality of subset of analytics;
instructions to communicate the set of applied analytics to a user, for display; and
instructions to receive a user selection input.

9. The computer program product of claim 8, wherein the plurality of electronic records includes one or more of: a set of textual data; a set of numerical data; and a set of graphical data.

10. The computer program product of claim 7, wherein the optimization goal is defined in response to instructions to receive a user input of a goal criteria, the goal criteria includes one or more of: a maximum time value; a maximum resource value; a maximum data retention value; and a minimum accuracy value.

11. The computer program product of claim 7, wherein the plurality of subsets of analytics include all permutations of the set of analytics.

12. The computer program product of claim 7, further comprising:
in response to instructions to receive, by the computer system, additional goal criteria from the user, instructions to apply the plurality of subsets of analytics to the set of data, response to receiving an additional goal criteria.

13. A computer system for optimizing data analysis, the computer system comprising:
one or more computer processors;
a computer-readable storage media;
program instructions stored on the computer-readable storage media for execution by at least one of the one or more processors, the program instructions comprising:
instructions to generate a plurality of subsets of analytics of a set of analytics, using a computer, in response to receiving the set of analytics;
instructions to define an optimization goal for applying the plurality of subsets of analytics;
instructions to apply the plurality of subsets of analytics to a set of data which includes a plurality of electronic records;
instructions to generate an output in response to the applying the plurality of subsets of analytics, being recorded on a data storage device accessible by the computer;
instructions to record a set of performance values of the computer system in response to applying the plurality of subsets of analytics to the set of data;
instructions to compare the recorded set of performance values with the defined optimization goal;
instructions to determine one or more subsets of analytics of the plurality of subsets of analytics wherein the recorded set of performance values associated with the one or more subsets of analytics are within a threshold difference value of the defined optimization goal;
instructions to identify an optimal subset of analytics of the one or more subsets of analytics, wherein the performance value of the optimal subset has the smallest deviation from the defined optimization goal when compared to the deviation from the optimization goal of all the performance values of all the one or more subsets of analytics; and
instructions to generate a set of applied analytics, the set of applied analytics includes the optimal subset of analytics of the one or more subsets of analytics that meet the goal criteria.

14. The computer system of claim 13 further comprising:
instructions to receive the set of data from the user, through a computer network, the set of data includes a plurality of electronic records;
instructions to store the set of data on a data storage device;
instructions to apply the plurality of subsets of analytics to the set of data, the set of data being an input to each of the subsets of analytics in the plurality of subset of analytics;
instructions to communicate the set of applied analytics to a user, for display; and
instructions to receive a user selection input.

15. The computer system of claim 14, wherein the plurality of electronic records includes one or more of: a set of textual data; a set of numerical data; and a set of graphical data.

16. The computer system of claim 13, wherein the optimization goal is defined in response to instructions to receive a user input of a goal criteria, the goal criteria includes one or more of: a maximum time value; a maximum resource value; a maximum data retention value; and a minimum accuracy value.

17. The computer system of claim 13, wherein the plurality of subsets of analytics include all permutations of the set of analytics.

18. The computer system of claim 13, further comprising:
in response to instructions to receive, by the computer system, additional goal criteria from the user, instructions to apply the plurality of subsets of analytics to the set of data, response to receiving an additional goal criteria.

* * * * *